United States Patent [19]

Kobori

[11] 4,318,604
[45] Mar. 9, 1982

[54] PLASTIC CAMERA BODY WITH METAL INSERT

[75] Inventor: Toshio Kobori, Sakai, Japan

[73] Assignee: Minolta Camera Kabushiki Kaisha, Osaka, Japan

[21] Appl. No.: 133,362

[22] Filed: Mar. 24, 1980

[30] Foreign Application Priority Data

Mar. 27, 1979 [JP] Japan .......................... 54-...[U]

[51] Int. Cl.³ .............................................. G03B 17/02
[52] U.S. Cl. .................................................. 354/288
[58] Field of Search ............... 354/288, 289, 203, 152, 354/293

[56] References Cited

U.S. PATENT DOCUMENTS

| | | | |
|---|---|---|---|
| 3,299,931 | 1/1967 | Kritzler | 354/288 X |
| 4,067,032 | 1/1978 | Yoshikawa et al. | 354/288 |
| 4,068,248 | 1/1978 | Pizzuti et al. | 354/293 X |
| 4,152,065 | 5/1979 | Kobori | 354/288 |

FOREIGN PATENT DOCUMENTS

| | | | |
|---|---|---|---|
| 480651 | 1/1952 | Canada | 354/288 |
| 53-32720 | 3/1978 | Japan | 354/288 |
| 53-39122 | 4/1978 | Japan | 354/288 |
| 515526 | 12/1939 | United Kingdom | 354/293 |

Primary Examiner—Donald A. Griffin
Attorney, Agent, or Firm—Wolder, Gross & Yavner

[57] ABSTRACT

A camera body particularly suited for a lens exchangeable single lens reflex camera is composed of a plastic body proper having a metal block insert, and including a pair of side housings for a film patrone chamber, a spool and sprocket chamber, a bottom wall and a pair of interconnecting portions extending between the housings. The metal block includes a flat rear plate portion having an exposure aperture, film pressure plate abutting surfaces and film guide rails, a pair of bent portions projecting forwardly from the opposite sides of the flat plate portion to constitute a part of the walls of the side housings, and a pair of front metal plate attaching portions formed at the front ends of the bent portions. The rear plate portion and the bent portions of the metal block are anchored or held by a pair of anchor portions of the plastic body proper, which continuously extend along the upper and lower opposite faces of the flat plate portion and the bent portions, respectively. A plurality of apertures packed or filled with plastic forming a part of the plastic body proper is formed in the metal plate.

20 Claims, 14 Drawing Figures

PLASTIC CAMERA BODY WITH METAL INSERT

FIELD OF THE INVENTION

The present invention relates generally to improvements in the body structure of a camera on which exchangeable objective lenses are selectively and detachably mounted and it pertains more particularly to an improved composite camera body structure in which a metal block including an exposure aperture, film pressure plate abutting surfaces and film guide rail surfaces is in inserted relationship with a molded plastic body proper.

BACKGROUND OF THE INVENTION

In the prior art camera body of the type in which a metal block is an insert in a plastic molded body proper, the metal block tends to separate from the plastic molded body proper due to the mold shrinkage of the plastic or upon impact on the composite body if the coupling of the plastic body proper to the metal block is insufficient. As a solution to the above drawback, an attempt has been made to form tapered holes in the metal block, such tapered holes being packed and filled with a part of the plastic constituting an inter-connecting portion which joins the left and right box-shaped housings, as proposed in the U.S. Pat. No. 4,152,065 granted May 1, 1979 to the inventor of the present invention (the corresponding Japanese patent applications were published as the Japanese laid-open publications Nos. Sho 53-32720 and 53-39122 on Mar. 28, 1978 and Apr. 10, 1978, respectively.)

In addition, a camera body made up by inserting a metal block, to which a front metal plate is attached, into a plastic molded body proper has been proposed in U.S. Pat. No. 4,067,032 granted Jan. 3, 1978.

While the camera body constructed in accordance with the above identified U.S. Pat. No. 4,152,065 sufficiently reduces the possibility of the metal block separating from the plastic molded body proper to permit its commercial and practical use, there still exists a demand for a camera body which further ensures the prevention of such separation.

OBJECT OF THE INVENTION

Accordingly, the primary object of the present invention is to provide an improved camera body with a metal block insert to a plastic body proper in which the possibility of the separation of the block insert from the molded plastic body proper is greatly reduced and substantially obviated.

SUMMARY OF THE INVENTION

In the camera body according to the present invention, a metal block provided with an exposure aperture, abutting surfaces for a film pressure plate and film guide rail surfaces is an insert in a molded plastic body proper, the molded plastic body proper includes a pair of anchoring means which hold in place from both sides opposite walls of the metal block near the upper and lower borders thereof. With the above construction, the metal block is firmly secured from both sides near the upper and lower borders thereof by the anchoring means which constitute a part of the molded plastic body proper. As a result, the metal block is reliably and effectively prevented from separating from the molded plastic body proper.

In the preferred embodiments of the present invention, the metal block includes a flat plate portion which is provided with the exposure aperture, abutting surfaces for the film pressure plate and film rail surfaces, as well as a pair of bent portions projecting forwardly from the opposite side ends of the flat plate portion and constituting part of the walls of a pair of opposite housings in the molded plastic body proper. The anchoring means extend along the opposite borders of both the flat plate portion and the bent portions near the upper and lower ends thereof respectively. Formed at each front end of the bent portions is a retainer which retains a front metal plate in position and which is also covered by a part of the plastic constituting the molded plastic body proper. In addition, the flat plate portion is provided with a plurality of holes similar to those described in the U.S. Pat. No. 4,152,065 and such holes are also packed and filled with a part of the plastic constituting the molded body proper.

The above and other features and advantages of the present invention will become more apparent from the following description taken in conjunction with the accompanying drawings.

BRIEF DESCRIPTION OF THE DRAWINGS

FIGS. 1 through 6 illustrate a camera body in accordance with a first embodiment of the present invention wherein:

FIG. 1 is a perspective view of the complete camera body.

FIG. 2 is a perspective view of the metal block component thereof.

FIG. 3 is a medial horizontal cross-sectional view of the complete camera body.

FIG. 4 is a fragmentary horizontal cross-sectional view of the camera body near the front metal plate attaching portion.

FIG. 5 is a vertical sectional along the plane of line I in FIG. 1 and,

FIG. 6 is a medial vertical sectional view of the complete camera body.

FIGS. 8 through 11 illustrate a second embodiment of the present invention wherein:

FIG. 8 is a perspective view of the complete camera body.

FIG. 9 is a perspective view of the metal block component thereof.

FIG. 10 is a medial horizontal cross-sectional view of the complete camera body and, FIG. 11 is a fragmentary horizontal cross-sectional view of the camera body at the level of a cutaway portion $2b_3$ and in which a front metal plate is attached.

DESCRIPTION OF THE PREFERRED EMBODIMENT

Figure 1:
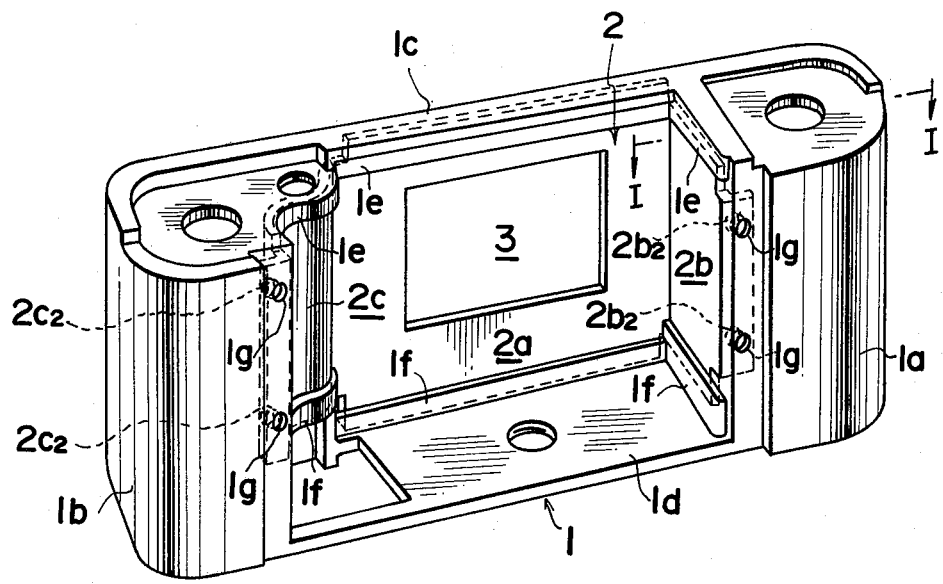

Hereinafter described are preferred embodiments of the present invention as applied to a single-lens reflex camera on which exchangeable objective lenses are selectively and detachably mountable.

Referring now to FIGS. 1 through 5 of the drawings which illustrate a first embodiment of the present invention, the reference numeral 1 generally designates the improved camera body proper which is integrally made of a reinforced plastic composition which is of the thermoplastic or thermosetting type, and metal block 2 is in the form of an insert in camera body proper 1.

Camera body proper 1 includes box-shaped housings $1a$ and $1b$ at its left and right ends and includes upper and lower interconnecting portions $1c$ and $1d$ extending between and bridging the housings to interconnect both housings. Interconnecting portion $1d$ is formed into the bottom wall of camera body proper 1 and is hereinafter referred to as a bottom wall. Housings $1a$ and $1b$ form a film patrone chamber and a chamber for a spool and a sprocket, respectively, together with bent portions of metal block 2 which will be described.

Figure 2:
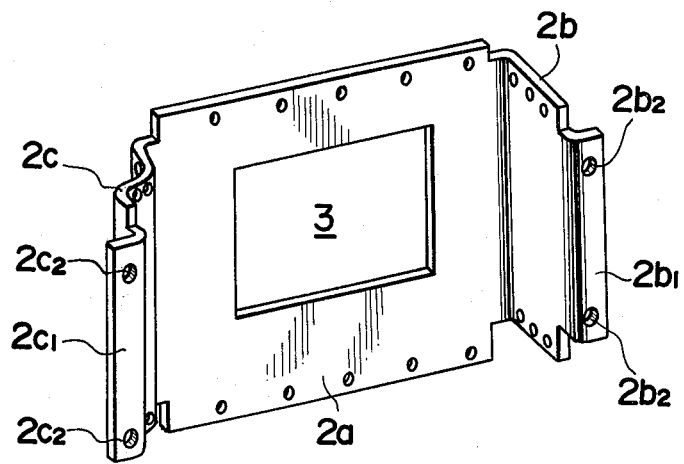
Figure 6:
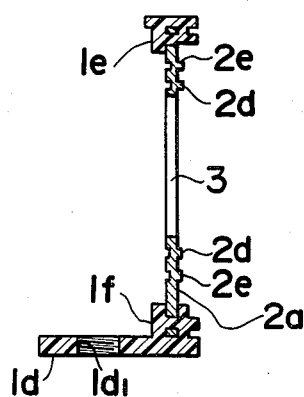

A metal plate, such as of aluminum or the like of suitable thickness (of e.g. 1, 5 mm to 2 mm) is pressed or formed into metal block 2 which has a rear flat plate portion $2a$ having formed therein an exposure or frame delineating rectangular aperture 3, as well as forwardly projecting bent portions $2b$ and $2c$ provided on the left and right ends of flat plate portion $2a$, as shown in FIG. 2. Formed on the rear surface of flat plate portion $2a$ are raised abutting surfaces $2e$ for the film pressure plate and film guide rail surfaces $2d$, as shown in FIG. 6, which if deformed, may directly affect the image definition capacity of the camera. Bent portion $2b$ and $2c$ constitute wall surfaces of the film patrone chamber and the chamber for a spool and a sprocket, respectively, together with housings $1a$ and $1b$.

As illustrated in FIG. 1, with metal block 2 inserted into camera body proper 1, a part of the plastic constituting interconnecting portion $1c$ extends along the inner and outer faces of and embraces the top border of flat plate portion $2a$ of metal block 2. In addition, a part of the plastic forming bottom wall $1a$ extends along the inner and lower faces of and embraces the bottom border of flat plate portion $2a$ and also extends along the inner and outer faces of and embraces the bottom borders of bent portions $2b$ and $2c$. Furthermore, a part of the plastic constituting housings $1a$ and $1b$ extends along the inner and outer faces of and embraces the top borders of bent portions $2b$ and $2c$. The plastic parts extending along the inner faces of metal block 2 form ribs $1e$ and $1f$ which are continuous along the top and bottom borders of flat plate portion $2a$ and bent portions $2b$ and $2c$ of metal block 2, respectively. Ribs $1e$ and $1f$, together with bent portions $2b$ and $2c$ of metal block 2, constitute a box-shaped frame.

As shown in FIG. 2, a plurality of holes are formed in the top and bottom borders, respectively, of flat plate portion $2a$ and bent portions $2b$ and $2c$ of metal block 2. These holes are used to direct the plastic constituting ribs $1e$ and $1f$ along the internal faces of metal block 2 from the external faces when camera body proper 1 is molded with metal block 2 inserted therein. After molding, the holes are packed and filled with the plastic, thereby connecting the ribs on the inner faces of metal block 2 integrally with the plastic part along the outer faces, whereby a firmer coupling of metal block 2 to camera body proper 1 is achieved.

Figure 3:
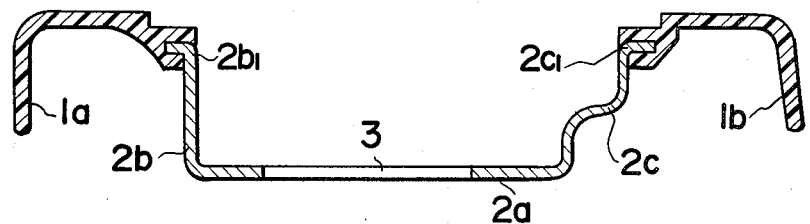
Figure 4:
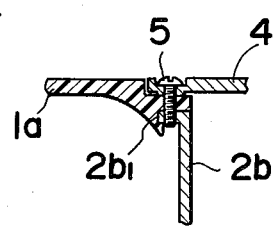
Figure 5:
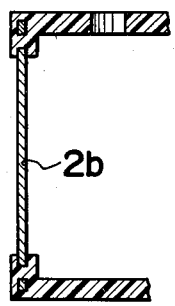

It should be noted that front ends of bent portions $2b$ and $2c$ of metal block 2 terminate in outwardly laterally directed coplanar flanges $2b_1$ and $2c_1$ which define a front metal plate attaching portion and are parallel to flat plate portion $2a$, and they are inserted into the plastic constituting housing $1b$ and $1c$ to be covered thereby, as shown in FIG. 3. Each of the plastic covered front metal attaching portions $2b_1$ and $2c_1$ forms an attaching surface for front metal plate 4. Front metal plate 4 is made of metal, such as aluminum or the like and is adapted to have exchangeable lenses (not shown) selectively mounted thereon in a conventional manner. As shown in FIG. 4, front metal plate 4 is secured through the plastic to front ends or flanges $2b_1$ and $2c_1$ of the bent portions by screw 5. In this case, the plastic contacts front metal plate 4 over a wide area, thereby avoiding a load being locally concentrated on front metal plate 4. As a result, the chances that metal block 2 may separate from camera body proper 1 by a load upon front metal plate 4 are eliminated whereby heavy exchangeable lenses, such as telephoto lenses, can be mounted on front plate 4 without any problem. It is to be understood that screw holes $2b_2$ and $2c_2$ are formed in flanges $2b_1$ and $2c_1$, and openings $1g$ are formed in body proper 1 which register coaxially with screw holes $2b_2$ and $2c_2$. Opening $1g$ are made by removing projecting pins of the corresponding metal molds out of camera body 1 after molding.

With the above construction of the improved camera body, metal block 2 is held by ribs $1e$ and $1f$ and the external plastic corresponding to ribs $1e$ and $1f$. This prevents metal block 2 from separating from or becoming loose on camera body proper 1 and a firmer coupling between metal block 2 and camera body proper 1 is obtained. In addition, a high rigidity is achieved by the box-shaped frame formed by continuous ribs $1e$ and $1f$ and bent portions $2b$ and $2c$, thereby preventing any malformation of flat plate portion $2a$ of metal block 2 due to plastic shrinkage, distortion or external force, whereby deterioration of the image definition capacity of the camera is prevented.

Figure 7:
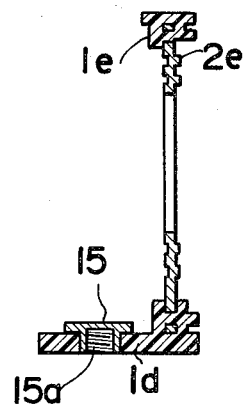
FIG. 7 is a similar view to FIG. 6 illustrating a modification in the first embodiment, in which the tripod screw attaching portion is modified.
Figure 8:
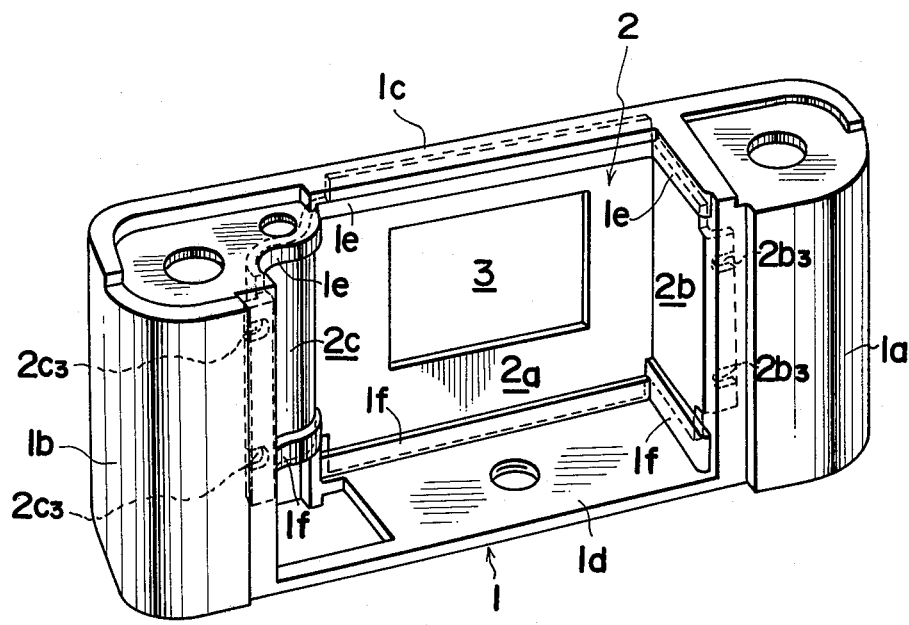
Figure 9:
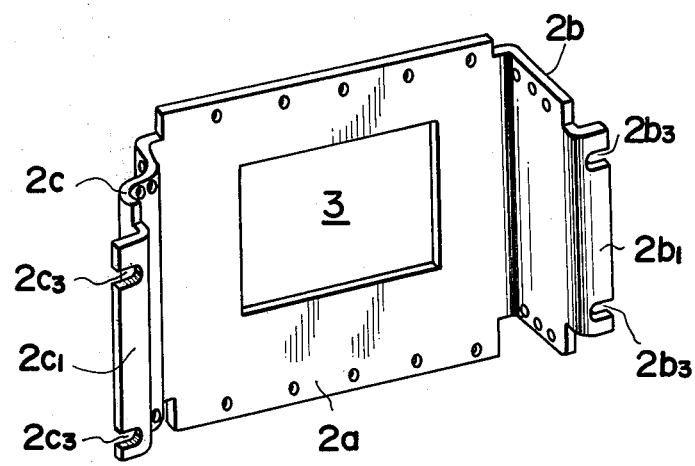

It should be understood that bottom wall $1d$ is made of plastic, resulting in no appreciable increase in the weight of the entire camera body even if the bottom wall $1d$ is sufficiently thick. This makes it possible to directly form a tripod screw hole $1d_1$, for example in bottom wall $1d$ and permit the support of the entire camera body by a tripod screw (not shown) fitted into tripod screw hole $1d_1$, as shown in FIG. 6. In addition, a metal member 15 having a tripod screw hole can be fitted into bottom plate $1b$, as shown in FIG. 7. Furthermore, a battery case (not shown) can be formed integrally on bottom wall $1d$. Little extra in labor and expense is required for the formation of the tripod screw hole and the battery case since metal molds for use in molding the bottom wall have only to be constructed into corresponding forms.

It is to be noted that film guide rail ridges or surfaces $2d$ and film pressure plate abutting ridges or surfaces $2e$ project rearward beyond the rear face of flat plate portion $2a$, as shown in FIG. 6 and 7, while portions of the front face of flat plate portion $2a$ corresponding to those surfaces are depressed into valleys or recesses. This is because film rail surfaces $2d$ and film pressure plate abutting surfaces $2e$ are embossed from the front when metal block 2 is stamped or pressed. Film rail surfaces $2d$ and film pressure plate abutting surfaces $2e$ require a high precision, which is achieved by milling after the press embossment.

Figure 10:
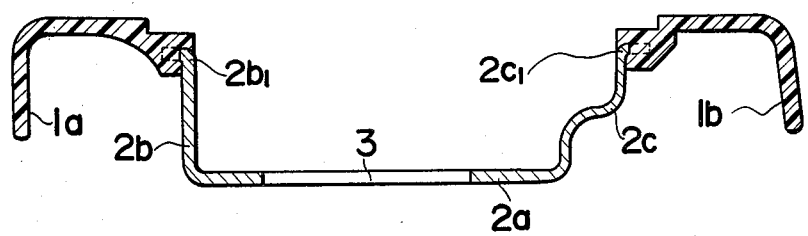
Figure 11:
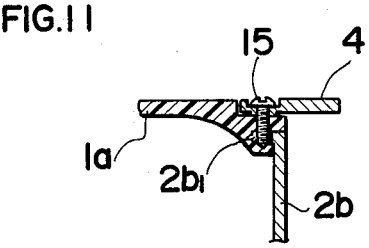

Referring to FIGS. 8 through 11 of the drawings which illustrate a camera body and metal block 2 for use therein according to a second embodiment of the present invention, cutaway portions $2b_3$ and $2c_3$ in place of screw holes $2b_2$ and $2c_2$ are formed of flanges or bent portions $2b_1$ and $2c_1$ of metal block 2. With the metal block 2 inserted into camera body proper 1, as shown in FIG. 10, self tapping screws 15 whose diameter is smaller than the longitudinal width of cutaway portions $2b_3$ and $2c_3$ are screwed into a portion of camera body proper 1 which overlaps cutaway portions $2b_3$ and $2c_3$ for attaching front metal plate 4 as shown in FIG. 11. Such a structure for attaching front metal plate 4 by tapping screws 15 provides many advantages. Specifically, with the construction according to the first embodiment, a force tends to shift metal block 2 and camera body proper 1 relative to each other during the insertion of screws 5 if screw holes $2b_2$ and $2c_2$ are transversely offset from corresponding openings $1g$, whereby stress is imparted to camera body proper 1 thereby causing cracks. Therefore, when molding a camera body proper using metal molds, screw holes $2b_2$ and $2c_2$ and openings $1g$ should be precisely matched by adjusting the position of metal block 2 inside the metal molds. In contrast thereto with the second embodiment of the present invention, tapping screws 15 have only to be screwed into the molded camera body proper 1 so that they may traverse cutaway portions $2b_3$ and $2c_3$ of metal block 2 after the molded camera body proper 1 having metal block 2 as an insert therein has been removed from the metal mold as shown in FIG. 10. This requires no adjustment to be made attendant to the molding in the position of metal block 2 inside the metal mold, and yet the occurrence of concentrated stresses is obviated. In addition, no tapping is required for cutaway portions $2b_3$ and $2c_3$, thus simplifying the manufacture of metal block 2 with less steps.

Figure 12:
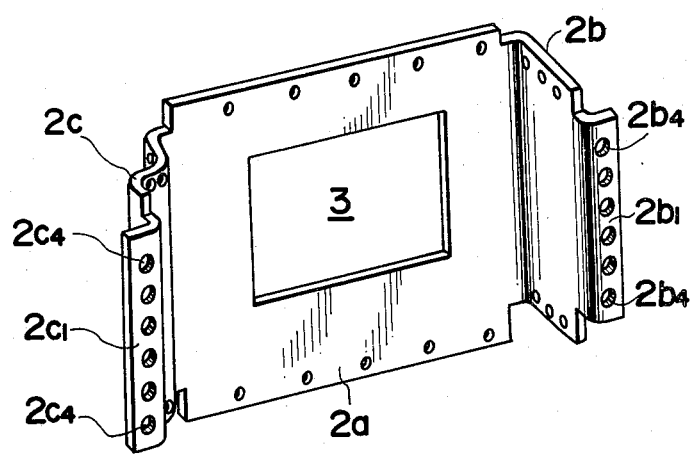
FIGS. 12 and 13 are perspective views illustrating modifications of a metal block, respectively.
Figure 13:
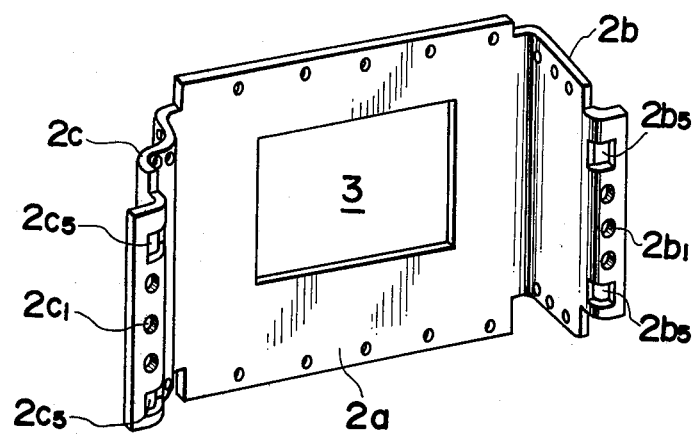
Figure 14:
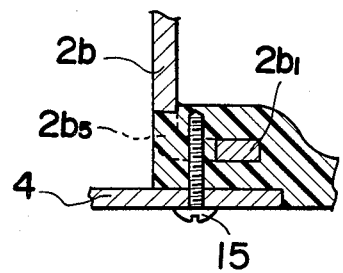
FIG. 14 is a fragmentary horizontal cross-sectional view at the level of opening $2b_5$ of the metal block in FIG. 13 inserted into a molded plastic body proper, to which a front metal plate 4 is attached.

Metal block 2 shown in FIG. 12 uses openings $2b_4$ and $2c_4$ in place of cutaway portions $2b_3$ and $2c_3$ in the second embodiment. Other openings as shown in the diagram are also formed in bent portions $2b_1$ and $2c_1$. Openings $2b_4$ and $2c_4$ are suffiently larger in diameter than the tapping screws to be passed therethrough, whereby adjustment of metal block 2 inside the metal mold is likewise not required in this embodiment, thereby avoiding the occurrence of concentrated stresses in camera body proper 1. The other openings remain packed and filled with a plastic and are used to prevent the separation of bent portions $2b_1$ and $2c_1$. The metal block shown in FIG. 13 uses openings $2b_5$ formed in the junction of bent portions $2b_1$ and $2b$ and openings $2c_5$ formed in the junction of bent portions $2c$ and $2c_1$ in place of openings $2b_4$ and $2c_4$ in FIG. 12. Openings $2b_5$ and $2c_5$ are packed and filled with a plastic when metal block 2 is inserted into camera body proper 1. Afterwards, tapping screws 15 are inserted through the openings, as shown in FIG. 14.

The embodiments according to the present invention have been described using the drawings, and the present invention is not limited to such embodiments. For example, the camera body in the above embodiments is designed for use in a single-lens reflex camera and accordingly no top wall is provided for camera body proper 1 to ensure a viewfinder light path. However, for a camera which requires no space for a viewfinder light path on the top, like a camera having a see-through type finder, a top wall can be integrally formed of plastic on camera body proper 1. In this case, top and bottom ribs $1e$ and $1f$ are reinforced by the top and bottom walls, making camera body proper 1 more rugged. In addition, metal block 2 in the above embodiments may be made of diecast metal using aluminum or the like.

While there have been described and illustrated preferred embodiments of the present invention, it is apparent that numerous alterations, omissions and additions may be made without departing from the spirit thereof.

What is claimed is:

1. In a metal inserted plastic camera body which comprises a metal block having an exposure aperture, film pressure plate abutting surfaces and film guide rails, and a plastic body proper with said metal block inserted therein and including a pair of opposite side housings and a pair of interconnecting portions interconnecting said side housings, the improvement wherein said interconnecting portions are formed with a pair of anchor means continuously extending along the opposite faces of the upper and lower borders of said metal block for anchoring said metal block to said plastic body proper by continuously and closely contacting both of said opposite faces, each of said anchor means being substantially equal in length in the portions thereof located in front of and behind said metal block.

2. The improvement as defined in claim 1, wherein said metal block includes a flat plate portion having said exposure aperture, said film pressure plate abutting surfaces and said film guide rails, and a pair of bent portions projecting forwardly from the opposite side ends of said flat plate portion to constitute a part of the walls of said housings.

3. The improvement as defined in claim 2, wherein one of said anchor means continuously extends along the opposite faces of the upper borders of said flat plate portion and said bent portions while the other of said anchor means continuously extends along the opposite faces of the lower borders of said flat plate portion and said bent portions.

4. The improvement as defined in claim 3, further comprising a set of screws and a front metal plate on which an exchangeable lens is attachable, wherein said metal block further includes a pair of front metal plate attaching portions provided at the front ends of said bent portions respectively, said plastic body proper further includes a pair of front cover portions covering said front metal plate attaching portions and said front metal plate is attached to said front metal plate attaching portions through said front cover portions by said screws.

5. The improvement as defined in claim 4, wherein each of said front metal plate attaching portions has formed therein a set of screw holes while each of said front cover portions has formed therein openings which are in alignment with respective screw holes and wherein said screws are screwed into said screw holes through said openings for attaching said metal plate to said front metal plate attaching portions.

6. The improvement as defined in claim 4, wherein each of said front metal plate attaching portions has formed therein a set of cutaways having a width larger than the diameter of said screws and filled with a part of said front cover portions of said plastic body proper, and wherein said screws are self tapping screws which are screwed into said front cover portions to traverse said cutaway portions for attaching said front metal plate to said front metal plate attaching portions.

7. The improvement as defined in claim 4, wherein each of said front metal plate attaching portions has formed therein a set of through holes having a diameter larger than that of said screws and filled with a part of said front cover portions of said plastic body proper, and wherein said screws are self tapping screws which are screwed into said front cover portions to pass through said holes for attaching said front metal plate to said front metal plate attaching portions.

8. The improvement as defined in claim 7, wherein a part of said through holes are formed along both one of said front metal plate attaching portions and one of said bent portions while the rest of said through holes are formed along both the other of said front metal plate attaching portions and the other of said front metal plate attaching portions.

9. The improvement as defined in claim 1, wherein one of said interconnecting portions is formed into a bottom wall of said camera body.

10. The improvement as defined in claim 9, wherein a part of said bottom wall has formed therein a tripod screw hole.

11. The improvement as defined in claim 9 further comprising a tripod screw receiving member, wherein a part of said bottom wall has formed therein a hole engaged by said tripod screw receiving member.

12. The improvement as defined in claim 1, wherein said metal block has formed therein a set of tunneled holes filled with a part of said plastic body proper, and wherein said anchor means are formed to be continuous along the opposite faces of said metal block through said part of said plastic body proper filled in said tunneled holes.

13. The improvement as defined in claim 1, wherein said metal block is made of a diecast metal plate.

14. The improvement as defined in claim 1, wherein said metal block is made of a pressed metal plate.

15. The improvement as defined in claim 14, wherein said film pressure plate abutting surfaces and said film guide rails are embossed with the pressing of said metal plate.

16. A composite metal plastic camera body comprising a metal insert component including a laterally extending vertical rear web having an exposure aperture therein and film pressure plate abutting surfaces and film guide rails on its rear face and a molded plastic component including a pair of laterally spaced housing sections and upper and lower bridging members extending between said housing sections and continuously extending along and embracing the upper and lower borders of said rear web to continuously and tightly contact both of the opposite faces of said upper and lower borders to anchor said rear web to said plastic component, each of said bridging members being substantially equal in length in the portions thereof located in front of and behind said rear web.

17. The camera body of claim 16 wherein said web upper and lower borders have apertures formed therein and including plugs integrally formed with said plastic component and filling said apertures.

18. The camera body of claim 16 wherein said metal insert component includes side webs projecting forwardly from opposite sides of said rear web and defining housing walls with said housing sections and said plastic component includes portions extending along and embracing the upper and lower borders of said side webs and continuously engaging the opposite faces of said side web upper and lower borders.

19. The camera body of claim 18 wherein said side webs terminate at their front ends in laterally coplanar flanges for supporting a lens mounting plate.

20. The camera body of claim 19 wherein said plastic component includes portions overlying the front faces of said flanges.

* * * * *